United States Patent [19]

Chaborski

[11] 4,139,301
[45] Feb. 13, 1979

[54] DISTANCE MEASURING LASER APPARATUS FOR DELAYED TIME MEASUREMENTS

[75] Inventor: Hoiko Chaborski, Munich, Fed. Rep. of Germany

[73] Assignee: Mitec-Moderne Industrietechnik GmbH, Munich, Fed. Rep. of Germany

[21] Appl. No.: 816,699

[22] Filed: Jul. 18, 1977

[30] Foreign Application Priority Data

Jul. 31, 1976 [DE] Fed. Rep. of Germany ....... 2634627

[51] Int. Cl.² .............................................. G01C 3/08
[52] U.S. Cl. ...................................... 356/5; 343/12 R; 307/312; 307/354; 307/320; 328/223
[58] Field of Search .............. 343/12; 356/5; 328/113, 328/223, 320; 307/233, 312, 354; 329/DIG. 1; 357/14

[56] References Cited

U.S. PATENT DOCUMENTS

| | | | |
|---|---|---|---|
| 3,723,002 | 3/1973 | Everest et al. | 356/5 |
| 3,830,567 | 8/1974 | Riegl | 356/5 |
| 3,869,207 | 3/1975 | Hermet et al. | 356/5 X |
| 3,877,813 | 4/1975 | Hayes et al. | 356/5 X |
| 3,911,297 | 10/1975 | Merrin et al. | 307/320 |

Primary Examiner—John S. Heyman
Attorney, Agent, or Firm—W. G. Fasse; D. F. Gould

[57] ABSTRACT

The present distance measuring laser apparatus measures the delayed time occurring between two signals derived from a laser beam and a reflected light beam and received in two separate channels. One channel is the reference channel and provides a starting signal when a light signal is emitted by the laser. The other channel is the measuring channel and provides a stop signal at the time of the return of a reflected light beam. An identical input circuit is provided in each signal channel. The receiver input rectifier or diode of each input circuit has a working impedance including a parallel resonance circuit made up of the barrier layer capacity of the diode, of an inductance coil and a further, external capacity.

2 Claims, 3 Drawing Figures

DISTANCE MEASURING LASER APPARATUS FOR DELAYED TIME MEASUREMENTS

BACKGROUND OF THE INVENTION

The present invention relates to a distance measuring laser apparatus for delayed time measurements. More specifically, the invention relates to an input circuit means for such a distance measuring apparatus. Such distance measuring laser devices operate by measuring the travel or delayed time of a light impulse emitted by a laser and received, after reflection, by a receiver. Two channels are provided in the system. One channel is the so-called reference channel for deriving a starting signal in response to the emission of light impulses by the laser transmitter. The starting signal does not involve any delay time. The second channel is the so-called measuring channel and provides a stop signal in response to the reflected light impulse following the above mentioned delay time.

Such measuring devices or systems are known in the art. Reference is made in this context to German Patent Publications (DOS) 2,315,815, (DAS) 2,315,816, and (DOS) 2,348,458. These systems measure distances in accordance with the principles employed in pulse delay radar systems. In these laser distance measuring devices the delay time or traveling time of a wave packet is evaluated as a measure of the distance between an observer and a target, for example, a reflecting body. Thus, the determination of the distance is accomplished by measuring the time interval between the time of emitting an impulse and the time of return of the light impulse reflected by the target. In this type of distance measuring it is necessary that the time interval of the emission of a pulse and its return after reflection is not larger than the sequence period of the pulses because otherwise there would be an ambiguity in the interpretation of the measured distances.

Thus, known devices with so-called diode receiver or rectifier circuits have the disadvantage that they require a special intensity control for eliminating the above mentioned time ambiguities or uncertainties. Such intensity control is necessary because the receiver slope or receiver sensitivity varies as a function of the received light intensity.

OBJECTS OF THE INVENTION

In view of the above, it is the aim of the invention to achieve the following objects, singly or in combination:

to provide a light impulse delay time measuring device as described above, wherein the time uncertainties or ambiguities are eliminated without a special intensity control of the input diode rectifier circuit means;

to provide an input circuit arrangement for a laser distance measuring device, wherein incoming light impulses of different intensities may be converted into a time significance or time definite transistor-transistor logic signal or into any other type of logic signal;

to start a parallel resonance circuit in a definite manner in response to incoming light signals of different intensities; and to provide a simple laser distance measuring device for ascertaining even very short distances.

SUMMARY OF THE INVENTION

According to the invention the above objects have been achieved by means of a laser distance measuring device which operates on the principle of a transit time measuring of a light impulse by means of two channels, whereby one channel is the so-called reference channel for providing a starting signal, and whereby the other channel is the so-called measuring channel for providing a stop signal which coincides with the return of the reflected light impulse, said device having a diode receiver circuit arrangement with a working impedance comprising a parallel resonance circuit which comprises an inductance coil and which includes the barrier layer capacity of the receiver rectifier or diode as well as an additional external capacity connected in parallel to said inductance coil and said barrier layer capacity.

The combination of the just enumerated features has the advantage that the received, or rather, reflected light impulse triggers the parallel resonance circuit through the light sensitive receiver diode or rectifier in a defined manner, whereby the parallel resonance circuit starts to oscillate with its resonance frequency. The resulting signal has a sine wave form and the passage of such sine wave form through zero is independent of the intensity of the received reflected light signal. The zero passage points of the sine wave are precisely correlated to the time of the receipt of the reflected light beam and the resonance frequency of the parallel resonance circuit is known. Therefore, an optimal measuring precision is obtained which was not possible in such a surprisingly simple manner heretofore.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
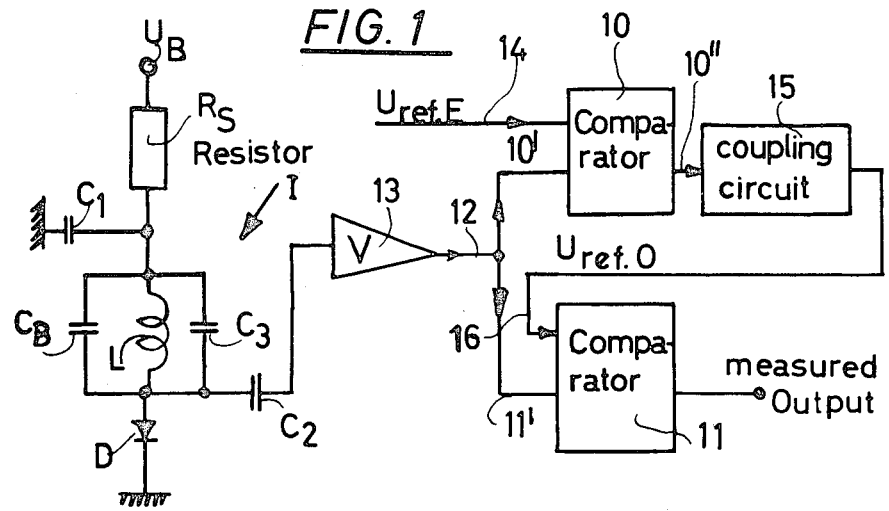
FIG. 1 illustrates the arrangement of the present parallel resonance circuit connected to two detection comparators.
Figure 2:
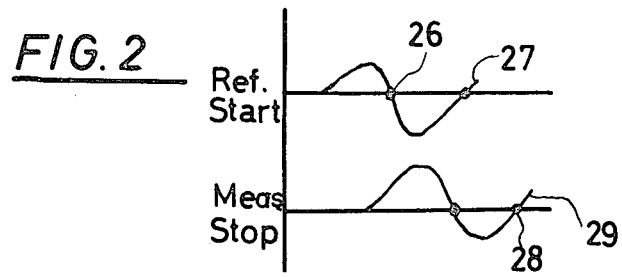
FIG. 2 illustrates the sine wave form of the reference start signal and the measuring stop signal.

Referring first to FIG. 2 there is shown the sine wave form of a reference start signal and the sine wave form of a measuring stop signal. The reference start signal is generated in a parallel resonance circuit identical to that shown at 1 in FIG. 1. Since both parallel resonance circuits are identical to each other, only one is shown, namely, the one for generating the measuring stop signal in response to the receiving of a return light signal which triggers the parallel resonance circuit 1 through the light sensitive diode D into oscillation. As long as the light impulse maintains the same light impulse wave form, the start of the oscillation of the resonance circuit 1 coincides precisely with the time of the receiving of the reflected light impulse. Corresponding to the fixed resonance frequency of the resonance circuit, the passage of the reference start signal through zero and the passage of the measuring stop signal through zero are also precisely correlated to the emission of a light signal and to the receipt of a light signal respectively as illustrated in FIG. 2.

Referring to FIG. 1, the parallel resonance circuit 1 comprises an inductance coil L, an external capacity $C_3$ and the barrier layer capacity CB of a light sensitive receiver diode or rectifier D. An input circuit is formed by the filter resistor $R_S$ and the capacitor $C_1$ which operatively connects the barrier layer capacity CB in parallel to said parallel resonance circuit. The resistor $R_S$ is connected to a supply voltage such as a battery voltage UB and connected in series with the just described parallel resonance circuit 1 which in turn is connected in series with the light sensitive rectifier diode D. The signal derived by the light sensitive diode D from the emitted light beam or from the returned light beam starts the oscillation of the just described parallel resonance circuit, whereby the latter generates the above described sine wave.

The output of the just described circuit arrangement is coupled by a capacitor C2 to a high frequency voltage amplifier 13, the output 12 of which is connected to the comparing input 10' and to the comparing input 11' of the comparators 10 and 11 respectively.

The comparator 10 has a reference input 14 to which there is applied the reference signal $U_{refE}$ which is derived in the manner described above from the emission of a light beam. The output 10" of the comparator 10 is connected through a coupling circuit 15 which provides a zero reference signal $U_{refo}$ to the reference input 16 of the comparator 11 at the output of which the desired measured signal is provided. The circuit arrangement 15 is shown in more detail in FIG. 3.

Figure 3:
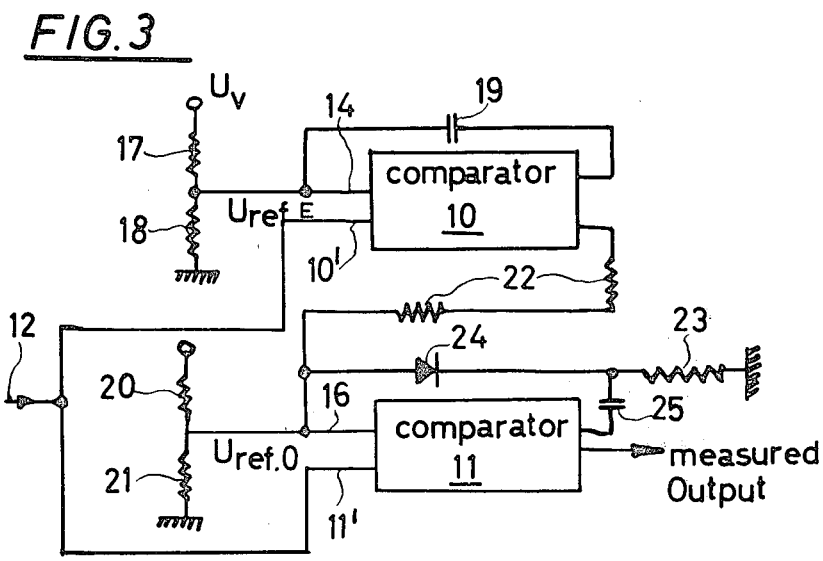
FIG. 3 illustrates in more detail the interconnection of the two comparators of FIG. 1.

Referring to FIG. 3, the reference input 14 of the comparator 10 receives the reference signal voltage $U_{refE}$ from a voltage divider comprising resistors 17 and 18 connected to a supply voltage $U_v$. A feedback capacitor 19 connects one output of the comparator 10 to its comparing input 14. The reference input 16 of the comparator 11 is also connected to a voltage divider comprising the resistors 20 and 21 which in turn are connected to a supply voltage KV. In addition the reference input 16 receives the reference voltage $U_{refo}$ from the circuit arrangement 15 comprising the resistors 22 and 23 as well as a rectifier 24 and a coupling capacitor 25 connected to one output of the comparator 11.

The reference voltage $U_{refE}$ is an analog voltage having a value equal to the threshold to be detected. As described with reference to FIG. 1 this voltage is derived from the emission of a light signal which starts the oscillation of an oscillation circuit identical to oscillating circuit 1. The second sine amplitude of the sine wave exceeds the value of the voltage $U_{ref}$ and thus the threshold of the comparator 10. The reference voltage $U_{refE}$ is fixed comparing voltage generated in the circuit as just described.

Incidentally, both comparator circuits 10 and 11 are shelf items and may, for example, be realized by a comparator of the type Am686 manufactured by Advanced Micro Devices. The diode 24 may, for example, be of a conventional type such as "1N4148" and the negative feedback coupling capacitor 25 may have a capacity of 10 to 20 nF. The circuit arrangement 15 switches the reference input 16 of the comparator 11 to zero corresponding to the passage of the sine waves through zero, whereby the comparator detects the respective zero passage to provide a TTL signal flank at the "measured output" of the comparator 11.

The diode D of the receiver rectifier or detector may also be conventional provided that it has a response time which does not exceed 1 nano second (nsec). For example, such a detector diode may be of the type "BTX65" manufactured by Siemens.

The capacitors C1 and C2 each have a capacity of 10 nF. The capacitor C3 may have a capacity between 10 to 40 pF and the resonance inductance coil L may have an inductance of 10 to 20 micro henri $\mu$H. The resonance frequency of the parallel resonance circuit 1 may, for instance, be within the range of 8 to 15 megacycles.

In operation, the presence of a sinus signal and its passage through zero are detected because the output of the oscillator circuit 1 is connected through the high frequency amplifier 13 to the inputs 10' and 11' of the comparators 10 and 11. Comparator 10 detects the fact that a light impulse has been emitted which starts the reference sine wave 27 when the light sensitive diode D triggers the respective parallel resonance circuit. Comparator 11 in the reference channel detects the zero passage 26 of the sine wave signal 27. For this purpose the reference threshold of the comparator 10 is adjusted to the smallest or weakest light impulse responsive signal to be received by the comparator 10, whereas the reference threshold of the second comparator 11 is switched to zero immediately following the response of the first comparator 10, whereby the first comparator 10 enables the second comparator 11 to detect said zero passage 26. In this manner logic (TTL) signal flanks are produced which are so interrelated with each other or which may be related to each other in such a manner that the time difference between the respectively produced start and stop signals may be ascertained and evaluated.

As mentioned above, the reference channel providing reference voltage $U_{refE}$ is identical to the measuring channel with the oscillating circuit 1 shown in FIG. 1. In the reference channel the first passage through zero shown at 26 of the first sine wave signal 27 is ascertained, whereas in the measuring channel the second passage through zero shown at 28 of the return signal responsive sign wave 29 is ascertained. In this manner the dead time or so-called propagation delay in the comparators 10 and 11 in the reference channel or in the measuring channel may be substantially eliminated.

If the resonance frequency of the parallel resonance circuit 1 is selected so that one fourth of the cycle duration or period of the resonance frequency is larger than the maximum specific dead time or propagation delay to be expected in the comparators 10 and 11, it is possible to measure extremely short distances approaching zero.

Referring again to FIG. 1 the filter resistor RS provides for the diode blocking voltage and the capacitors C1 and C2 constitute high frequency coupling capacitors. As mentioned, the circuit arrangement 15 switches the reference voltage supplied to the comparator 11 to zero exactly at the time when the comparator 10 responds, or rather, when the threshold of the comparator 10 is exceeded.

Although the invention has been described with reference to specific example embodiments, it will be appreciated, that it is intended to cover all modifications and equivalents within the scope of the appended claims.

What is claimed is:

1. An input circuit for a distance measuring laser apparatus comprising channel means, input rectifier circuit means in said channel means, said input rectifier circuit means comprising light responsive diode means having a barrier layer capacity, said input rectifier circuit means further comprising working impedance means including a parallel resonance circuit comprising an inductance coil and external capacitance means operatively connected to said light responsive diode means whereby the latter triggers said parallel resonance circuit in response to a received light impulse, said input rectifier circuit means further comprising means operatively connecting said barrier layer capacity of said light responsive diode means in parallel to said parallel resonance circuit.

2. The input circuit of claim 1, wherein said channel means comprise comparator circuit means and means operatively connecting said comparator circuit means to said parallel resonance circuit, said comparator circuit means having a given maximum dead time, said parallel resonance circuit having a resonance frequency such that one fourth of the respective cycle duration corresponds to a time period longer than said given maximum dead time.

* * * * *